G. W. PRICE.
CHANGEABLE SPEED TRANSMISSION MECHANISM.
APPLICATION FILED FEB. 19, 1910. RENEWED NOV. 21, 1912.
1,060,024.
Patented Apr. 29, 1913.
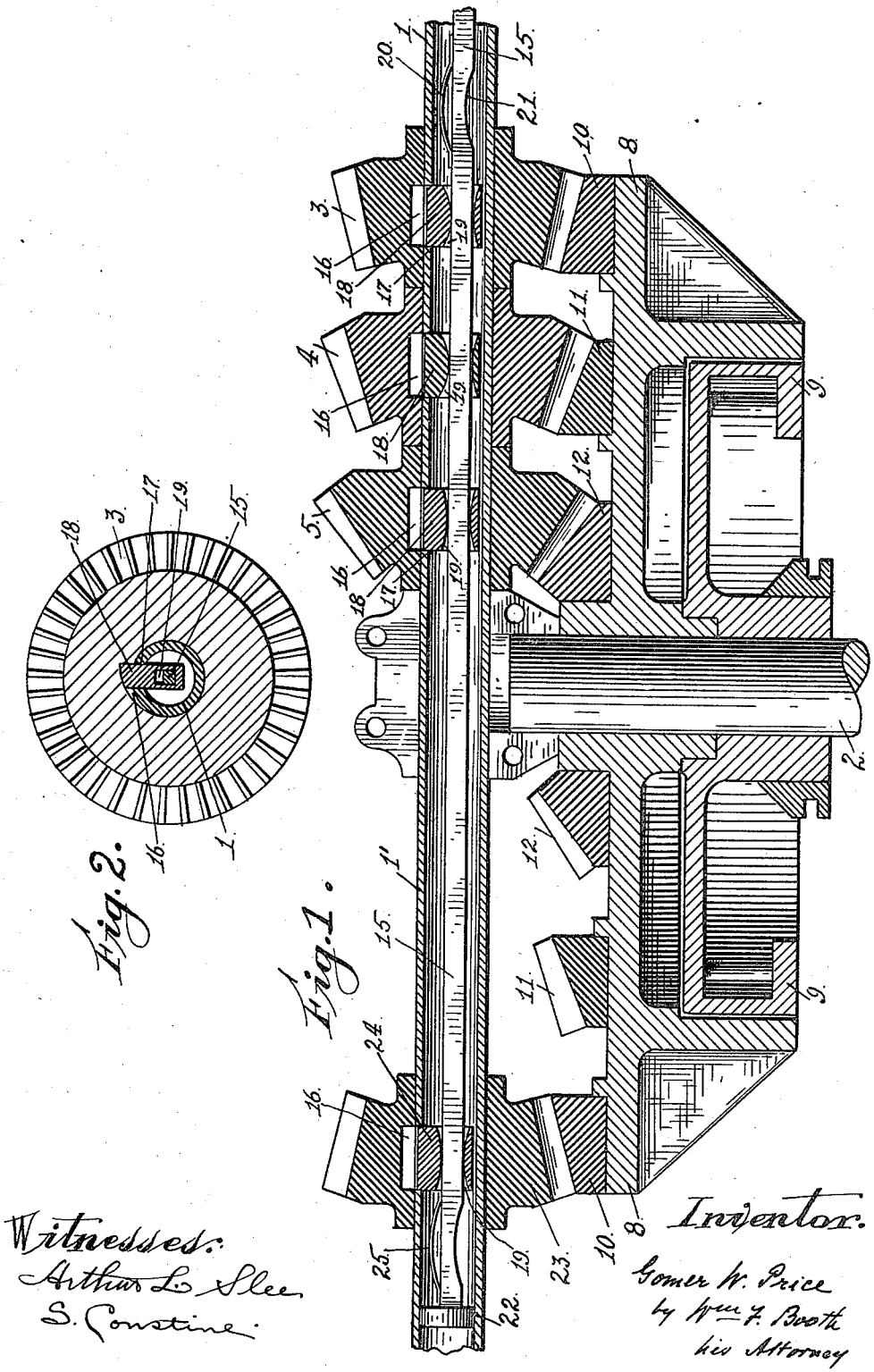

UNITED STATES PATENT OFFICE.

GOMER W. PRICE, OF OAKLAND, CALIFORNIA

CHANGEABLE-SPEED TRANSMISSION MECHANISM.

1,060,024.   Specification of Letters Patent.   Patented Apr. 29, 1913.

Application filed February 19, 1910, Serial No. 544,772. Renewed November 21, 1912. Serial No. 732,744.

*To all whom it may concern:*

Be it known that I, GOMER W. PRICE, a citizen of the United States, residing at Oakland, in the county of Alameda and State of California, have invented certain new and useful Improvements in Changeable-Speed Transmission Mechanisms, of which the following is a specification.

My invention relates to changeable-speed transmission mechanisms of the selective-gear type, as applied to self-propelled vehicles.

One of the most serious problems is the transmission of the power of the motor from the motor shaft while running at its most efficient and usually practical constant speed. Owing to the varied conditions of road and load, it is possible at times to propel the vehicle over the ground at a high rate of speed, while at other times, owing to excessive load or grade of roadway, or both, or because of the crowded or dangerous condition of the road, it becomes necessary to move along at a low rate of speed.
This cannot be accomplished (except to a very limited extent) by varying the speed of the motor, as a decrease in the motor speed usually means more than a corresponding decrease in power, whereas with a heavily loaded vehicle, or the same vehicle on a heavy grade, or in a case of draying or plowing, it becomes necessary to use the maximum power of the motor while the vehicle moves at a minimum rate of speed.
Present practice attempts to provide for this variation in speed by selecting a speed at which the vehicle is supposed to be operated most of the time, and making the speed of the prime moving shaft of the vehicle and that of the motor shaft coincide, thus enabling them to be coupled together when that particular speed is desired and permissible; and when so coupled it is commonly known as being "direct driven;" and should this be selected for the highest speed of the vehicle it is described or designated as being "direct driven on the high gear;" or should it be on the low speed it is commonly designated as being "direct driven on the low."

With many of the present designs it is possible to make one speed only "direct," while all self propelling road and plowing vehicles require at least two speeds forward and one speed reverse; some have as high as four speeds forward and one reverse.

These additional speeds as well as the reverse are secured frequently by means of one or more counter shafts as well as the addition of, at least, an extra pair of gears for each additional speed, and a similar additional counter shaft and gears for the reverse. These additional speeds not only lead to unnecessary complication and weight and unnecessarily absorb power, but their extended operation on any but the "direct driven" speed means, from the very nature of the design, endless trouble and invariable ruin to the transmission gearing.

The object of my invention is to overcome these deficiencies, by providing for all the speeds being "direct driven," and to this end my invention consists in the novel changeable-speed device which I shall now fully describe by reference to the accompanying drawings in which—

Figure 1 is a sectional view of my device showing the speed-selective connections and the arrangement of the reverse gear. Fig. 2 is a cross section through one of the pinions showing one of the keys projected to its engagement with the pinion.

1 is the driving shaft, and 2 is the driven shaft.

Mounted upon the driving shaft, and normally free to turn thereon is a pinion 3, a second pinion 4 and a third pinion 5. These pinions are to be severally and independently, as the occasion may require, connected with the driving shaft to rotate therewith, by any suitable connections which I shall presently describe. Freely mounted upon the driven shaft 2 is a hub 8, which is formed on its outer face with an annular flange constituting a clutch seat, said hub being adapted to be connected, as occasion may demand, with said shaft, by a suitable means, as for example, by the friction clutch 9 which fits within the clutch seat of the hub. This hub carries three gears, the largest one 10 meshing with pinion 3, the intermediate one 11 with pinion 4, and the smallest one 12 with pinion 5. It will now readily be seen, that if the highest speed be desired, the friction clutch 9 is thrown to engage the hub 8, and the pinion 5 is selected to be connected with shaft 1. If the intermediate speed is wanted, the pinion 4 is selected for connection with shaft 1. If the lowest speed is needed, the pinion 3 is selected for such connection. If the power is not to be transmitted at all, the several connections are all thrown out and the parts run free. It is thus obvious that all the speeds are "direct" drives, and by increasing the number of the pinions and gears with their relative proportions, any number of speeds may be had, all with a "direct" drive.

The driving shaft 1, is made hollow, and houses a slidable selective-speed-rod 15. The free pinions 3, 4 and 5 are here placed close together, and in the inner face of the hub of each is made a key-groove 16. In the wall of the driving shaft 1 are made the key-seats 17, in which are seated the keys 18, one for each pinion. These keys project into the hollow drive-shaft and slide radially in their seats. Each key has a double-taper passage-way 19, through which the speed-rod 15 passes. The speed rod 15 is provided with a spring 20 which is adapted to enter the socket 19 of any of the pinions, according to the movement of the rod. Opposite the key-lifting spring 20, the speed rod is cut out or narrowed as shown at 21 to enable the key to move outward when pressed by the spring. A collar 22 on the end of the gear selective speed rod guides its movement.

It will now be seen that when the speed rod is in such position that is spring 20 is beyond the key of the pinion 3, said rod will positively hold all the keys out of engagement with the pinions, because of passing through their sockets. But if the rod be shifted to the left, it will enter its spring 20 in the passage-way of that key which is to engage with the low speed pinion 3, thereby forcing said key out, (the cut away portion 21 of the rod permitting) until said key passes into the key-groove 16 of said pinion and thereby connects it with the drive shaft, and the machine will start on the low speed. A further shifting of the rod to the left will now cause the spring 20 to pass through the passage-way of the first key and will cause the full portion of said rod to draw back said key, and continued movement will carry the spring 20, to the next key, which will thereby be forced out to lock the intermediate pinion 4; and in similar manner, further movement of the rod will effect the locking of the high speed pinion 5. Thus a movement of the speed-rod in one direction will effect any of the forward drives. In this construction it is to be especially noted that if the key is forced out within its pinion when the latter is not in position to receive it in its key-groove, no harm will result, as the spring will compensate for this by yielding, and will exert only such pressure within the pinion bore as will permit the key to travel with the shaft until it engages automatically and without resistance in the pinion key-groove.

The "reverse" consists in extending the driving shaft as at 1' beyond the line of the driven shaft, and carrying upon it, freely mounted, a pinion or pinions meshing with the other side of the hub gears. In the present case I have shown only one such pinion, designated by 23, which pinion meshes with the largest gear 10 of the hub 8. This reverse pinion 23 is to be arbitrarily connected with the driving shaft extension 1', by a key 24, operated by the speed-rod through a spring 25 in the same manner as I have already described.

Having thus described my invention what I claim as new and desire to secure by Letters Patent is:—

1. In a changeable-speed transmission mechanism, the combination of a driving shaft; a driven shaft; a plurality of independent pinions freely revoluble on one of said shafts; a plurality of gears on the other shaft rotatable therewith, said gears and pinions correspondingly intermeshing, and respectively proportioned for different speeds; and means for selectively connecting any one of said pinions with its shaft to rotate therewith, consisting of a rod slidable within the pinion shaft, a plurality of keys seated within the shaft, one for each pinion, adapted to be projected therefrom to engage the pinions and connect them with the shaft, and a yielding connection between the rod and keys, by which the shifting of the rod projects and withdraws said keys.

2. In a changeable-speed transmission mechanism, the combination of a driving and a driven shaft, one of said shafts being hollow; a plurality of pinions freely revoluble on the hollow shaft, each pinion having an interior key groove in its hub; a plurality of gears on the other shaft correspondingly meshing with said pinions and respectively proportioned thereto for different speeds; a plurality of keys seated in the hollow shaft adapted to be projected therefrom to engage in the key grooves of the pinions, each of said keys having a socket through it; and a speed selective rod slidable in the hollow shaft and passing through the key-sockets, said rod having spring contacts and opposing cut out portions operating in conjunction with the key sockets to effect the projection and withdrawal of the keys by the shifting of the rod.

3. In a changeable-speed transmission mechanism, the combination of a driving and a driven shaft, one of said shafts being hollow; a plurality of pinions freely revoluble on the hollow shaft, each pinion having an interior key-groove in its hub; a plurality of gears on the other shaft, said pinions and gears being respectively proportioned for different speeds and relatively disposed for both forward and reverse drives; a plurality of keys seated in the hollow shaft adapted to be projected therefrom to engage in the key grooves of the pinions, each of said keys having a socket through it; and a speed selective rod slidable in the hollow shaft and passing through the key-sockets, said rod having spring contacts and opposing cut out portions operating in conjunction with the key sockets to effect the projection and withdrawal of the keys by the shifting of the rod.

4. In a changeable-speed transmission mechanism, the combination of a hollow driving shaft; a driven shaft at right angles to the driving shaft; a plurality of pinions freely revoluble on the driving shaft at one side of the driven shaft, and a pinion freely revoluble on the driving shaft at the other side of the driven shaft, each of said pinions having an interior key-groove in its hub; a hub freely revoluble on the driven shaft, said hub carrying concentric gears meshing with the pinions, one of said gears engaging one of the pinions disposed to one side of the driven shaft and also engaging the pinion disposed to the other side of said driven shaft; a clutch disposed to engage the outer face of the hub on the driven shaft to arbitrarily connect it to rotate with said shaft; independent keys seated in the hollow driving shaft adapted to be projected therefrom to engage the key-grooves in the pinion hubs; and a speed selective rod slidable in the hollow driving shaft and engaging the keys to separately project and retract said keys.

5. In a changeable-speed transmission mechanism, the combination of a hollow driving shaft, a driven shaft at right angles to the driving shaft; a plurality of pinions freely revoluble on the driving shaft at one side of the driven shaft, and a pinion freely revoluble on the driving shaft at the other side of the driven shaft, each of said pinions having an interior key groove in its hub; a hub mounted to rotate with the driven shaft and carrying concentric gears meshing with the pinions, one of said gears engaging one of the pinions disposed to one side of the driven shaft, and also engaging the pinion disposed to the other side of said driven shaft; independent keys seated in the hollow shaft adapted to be projected therefrom to engage the key grooves on the pinions, each of said keys having a passage-way through it; and a speed selective rod slidable in the driving shaft and passing through the key passage-ways, said rod having spring contacts and opposing cut out portions operating in conjunction with the key passage-ways to effect the projection and withdrawal of the keys by the shifting of the rod.

In testimony whereof I have signed my name to this specification in the presence of two subscribing witnesses.

GOMER W. PRICE.

Witnesses:
Wm. F. Booth,
D. B. Richards.